Patented Aug. 19, 1947

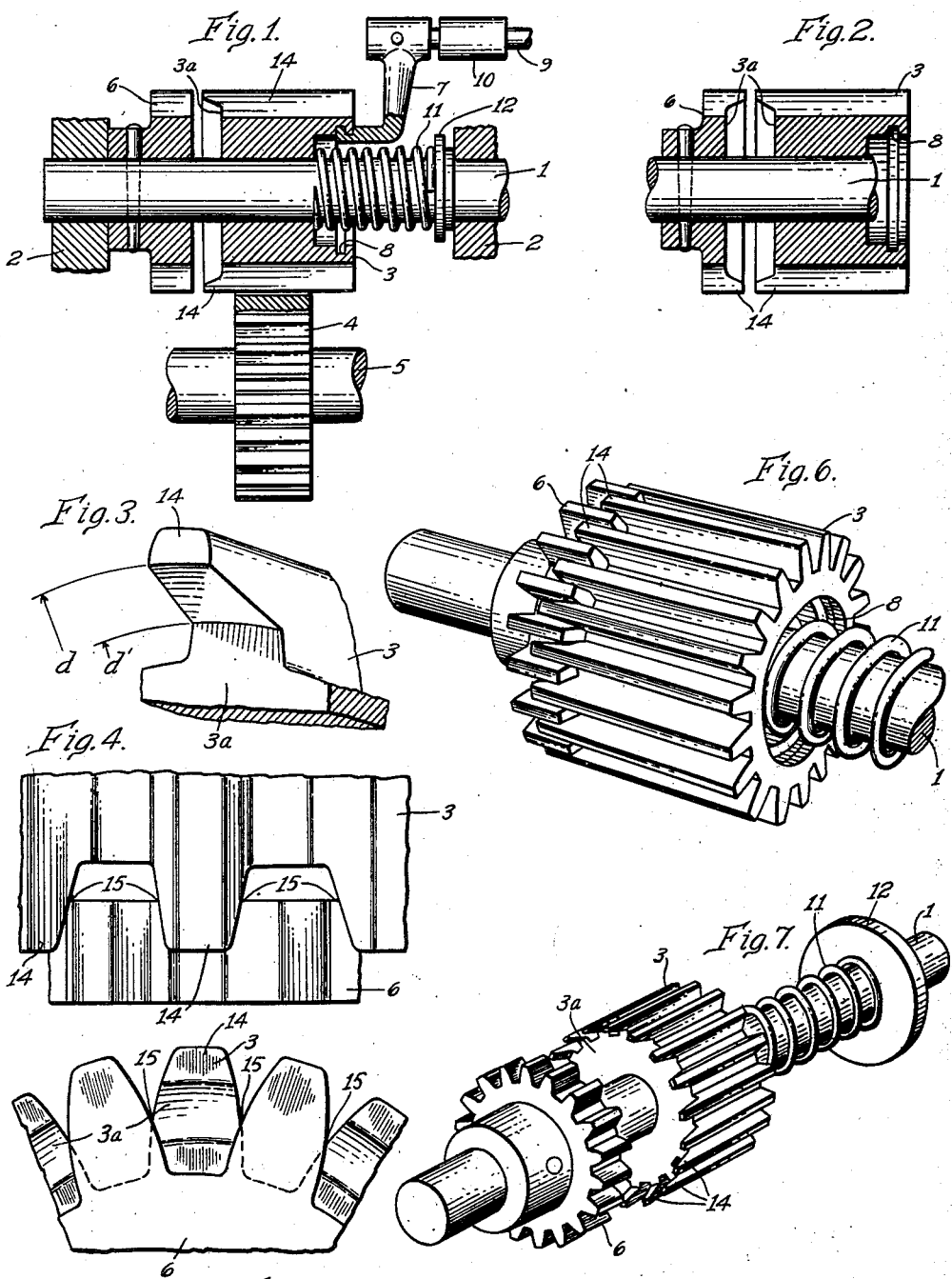

2,426,023

UNITED STATES PATENT OFFICE 2,426,023

CLUTCH

Kresten L. Jeppesen and Perceval H. Keays, Hamilton, Ontario, Canada, assignors to Westinghouse Electric Corporation, East Pittsburgh, Pa., a corporation of Pennsylvania Application February 10, 1944, Serial No. 521,790

8 Claims. (Cl. 192—67)

This invention relates to mechanical clutches and more particularly to mechanical clutches of the jaw type.

Considerable difficulty has been experienced in the past with clutch mechanisms in power transmission systems in which the motion being transmitted was reciprocating in nature. In such systems, as for example, those used for driving a washing machine agitator, the reversals of movement are fairly sharp and hence, the suddenly applied loads on the jaws of the clutch mechanism high.

The internal cup gear type of clutch as frequently been used in such systems but has proved unsatisfactory because of its backlash which resulted from providing clearance between the interlocking teeth. This clutch is also expensive to manufacture since it involves the cost of cutting tools and dies.

Another type of clutch employed in such mechanisms is the pin clutch. In this type of clutch a taper slot in the bottom of the driving pinion engages a pin secured in a hole in the shaft to be driven. While the pin clutch has no backlash and is inexpensive to manufacture it lacks structural strength. The pinion also has a tendency to jam on one side of the shaft if the slot is slightly to one side of the pinion centerline causing the drive to be on one end of the pin only. The pin also occasionally becomes loose.

The claw type clutch having interfitting taper milled projections and recesses is sturdy, but here also the sliding element of the clutch has a tendency to jam on one side of the shaft if the tapered slots and projection are not properly centered. The clutch is also expensive to manufacture.

A clutch transmitting reciprocating torque must be both sturdy and free of relative angular movement or backlash between the clutch elements otherwise excessive wear and possible failure of the clutch elements may result.

It is therefore a principal object of this invention to provide a clutch which is both sturdy and free of relative angular movement or backlash between the clutch elements.

It is another object of this invention to provide a jaw type of clutch having the afore-named characteristics, which is inexpensive to manufacture.

Still another object of this invention is to provide a jaw type clutch in which wear of the contacting surfaces is automatically compensated for.

A further object of the invention is to provide a jaw type clutch which slides freely into and out of engagement.

A specific object of the invention is to provide a jaw type of clutch which is readily manufactured from a pair of like externally toothed spur gears.

Yet another object of the invention is to provide a manufacturing process for an externally toothed spur gear jaw clutch which combines low cost and accuracy of the finished product.

Other objects and advantages will become apparent from a study of the following disclosure when considered in conjunction with the accompanying drawing, in which:

Figure 1 is a sectional view taken longitudinally of the clutch mechanism;

Fig. 2 is a sectional view of a modification of the invention illustrated in Fig. 1;

Fig. 3 is an enlarged view of a gear tooth in perspective illustrating the fundamental principle of this invention;

Figs. 4 and 5 are enlarged plan and end views, respectively, illustrating the interfitting or interlocking positions of the gear teeth; and, Figs. 6 and 7 are perspective views of the jaw clutch assembly and illustrate, respectively, the gear clutch elements in engaged and disengaged positions.

Referring now to Fig. 1 the numeral 1 denotes a shaft which is to be driven. This shaft is mounted in bearings 2. Rotatably and axially slidably mounted on the shaft 1 is a driving pinion 3 which is in continuous mesh with a driving gear 4 operated by the power transmitting shaft 5. An externally toothed member 6 which may be a gear having the same tooth configuration as pinion 3 is pinned or otherwise suitably secured to rotate with the shaft 1. Axial movement of the driving pinion 3 is obtained by a clutch actuating arm 7 which engages an annular recess 8 provided in the driving pinion 3. The clutch actuating arm is mounted on a rod 9 which is axially slidable in the bearing 10. This rod may be operated from any convenient point on the apparatus of which the clutch mechanism forms a part, and upon axial movement of the rod the driving pinion is moved either towards or away from the member 6. A helical compression spring 11 is disposed about the shaft 1 between a shaft collar 12 and the driving pinion 3. This spring exerts a predetermined axial force upon the driving pinion 3 in the direction of the member 6 and the driving pinion is restrained against movement towards the member 6 by the clutch actuating arm 7.

A conical recess 3a is turned or otherwise machined from the transverse face of the driving pinion 3 which confronts the externally toothed member 6. This conic recess is of such a diameter that axially extending tapered teeth 14 are formed. Thus upon movement of the slidably mounted rod 9 in the direction of the toothed member 6, the gear teeth extensions 14 interlock between the teeth of the toothed member 6 whereby rotational movements are transmitted from the driving pinion 3 to the member 6 and thence to the shaft 1.

A modification of this specific construction appears in Fig. 2. In this application the confronting transverse faces of both the driving pinion 3 and the toothed member 6 have conical recesses 3a machined therein such that both the driving pinion and member 6 have axially extending tapered teeth which interlock upon movement of one of the members into engagement with the other.

In Figs. 3, 4 and 5 enlarged fragmentary showings of the clutch elements illustrate clearly the particular configuration of the axially extending gear teeth 14 of the driving pinion 3 which result from the conical recessing. In Fig. 3 the two diameters of the bases of the conic sections formed by the conic recesses are shown. The diameter $d$ represents the diameter of the larger of the two bases, which base lies on the transverse face of the gear and is somewhat smaller than the addendum circle of the gear. The diameter $d'$ which represents the diameter of the smaller of the two bases of the conic section is somewhat greater than the dedendum circle of the gear. Thus the surface of the conic section extends axially of the gear teeth and slopes from a point within the addendum circle to a point outside of the dedendum circle and due to the particular configuration of the flank and face portions of the gear teeth which may be either cycloidal or involute or other suitable shape, a tooth extension is formed which tapers in both plan form and in thickness. In Fig. 4 the tapering plan form of the tooth is illustrated. It will now, therefore, be noted that upon interfitting the extending teeth of the driving pinion between the teeth of the member 6 which may be a gear similar to 3 that a multiplicity of point contacts 15 are obtained and thus the torque load, which is being transmitted, is distributed over a multiplicity of points, whereby the load on any particular point is greatly reduced.

The amount of taper which is obtained by the conic recessing of the transverse gear face depends largely upon the difference between the diameters of the bases of the conic section. The greater this difference the greater the taper. The amount of taper selected depends entirely upon design considerations for the particular power transmitting system. For one specific application it has been found that a slope of the conic surface of about 10 degrees with respect to the axis is most suitable, since, at this particular slope there is less tendency for the driving pinion to be forced clear of the toothed member 6 by the force resulting from the torque being transmitted, and further, that the toothed elements engaged and disengaged more freely.

As shown in Fig. 4 and also in Fig. 6 the conic recessing is of such a depth that the transverse faces of the clutch elements do not come into contacting relationship. Thus as wear occurs on the contacting or bearing points 15 the bias of the spring 11 axially moves the pinion into a deeper interlocking relationship with the toothed member 6. Hence, because of the tapering extending toothed sections, wear of the contacting or bearing points is automatically compensated for.

It is now apparent that a jaw type of clutch has been provided in which relative angular movement between the clutch elements is obviated. This in itself is an important factor in the development of a clutch. There are also other advantages which are realized from this type of construction. The most important of these being the ease with which this type of clutch may be manufactured. The manufacturing process involves but a few steps and these steps may be performed during the course of manufacture of the driving pinion. Preferably both members of the clutch assembly may be turned separately from bar stock in an automatic screw machine, that is, turned to the correct diameter if necessary, and the conic recesses turned in one of the transverse faces of one or both the members. Then by clamping the two members together the teeth of the member 6 can be cut together with the teeth of the pinion at the same time and with the same tool. It is thus apparent that the machining operations required to manufacture a clutch of this type are a minimum and that further by clamping the two clutch members together and machining them as a unit, that a degree of accuracy is obtained which obviates unequal contacting or bearing pressures amongst the bearing or contacting points 15. Thus there is no possibility of the driving element jamming on one side of the shaft as a result of unequally loaded bearing or contacting points.

There are, of course, other ways in which the clutch may be made. As an example it is conceivable that the teeth may be machined first and then the conic recess or recesses turned. The clutch member may be machined from a single piece of bar stock and after the teeth and conic recess or recesses are cut, cut transversely to form the two clutch members. The important feature being the simultaneous machining of the teeth of both elements. If identical spur gears are obtainable it is, of course, only necessary to perform the conic recess turning operation in one or both of the gears.

From the foregoing it is apparent that a jaw type of clutch has been provided which combines such desirable features as sturdiness, freedom of engagement and disengagement, absence of relative angular movement or backlash between the clutch elements and low cost of manufacture. The clutch is sturdy because the load is equally distributed over all the teeth. It engages freely and disengages freely and has no backlash when engaged because of the tapered gear teeth extensions and it is inexpensive to manufacture because both members can be manufactured as a unit.

The foregoing disclosure and showings made in the drawing are merely illustrative of the principles of this invention and are not to be considered in a limiting sense. The only limitations are to be determined from the scope of the appended claims.

We claim as our invention:

1. A clutch comprising, in combination, a pair of externally toothed, coaxially mounted members of substantially like diameters and having the same number of teeth, the teeth of said members being substantially of the configuration of gear teeth, said members each having conic recesses in the confronting transverse faces forming tooth extensions which taper in both plan form and depth, said tapered tooth extensions interlocking one member with the other upon axial movement of one of said members towards the other.

2. A clutch comprising, in combination, a pair of externally toothed coaxially mounted and relatively axially movable members of substantially like diameter and having the same number of teeth, the teeth of said members being substantially of the configuration of gear teeth, one of said members having a conical recess in the transverse face confronting the other member, the conical recess having its maximum diameter at the axial extremity of the member which diameter is less than the diameter of the addendum circle defined by the teeth thereof and a minimum diameter somewhat greater than the diameter of the dedendum circle defined by the teeth thereof, whereby axially extending tapered teeth are formed, said tapered teeth interlocking with the teeth of the other of said members upon axial movement of one member into engagement with the other.

3. A clutch comprising, in combination, a pair of externally toothed members of substantially the same diameter and of like tooth pitch, the teeth of said members being substantially of the configuration of gear teeth, said members being coaxially mounted and one of said members being axially movable relative to the other, one of said members having the transverse face thereof confronting the other of said members conically recessed such that the large diameter of the conical recess is in the plane of the confronting transverse face and of a diameter less than the addendum circle defined by the teeth thereof, and the small diameter of the conical recess being greater than the dedendum circle defined by the teeth thereof, said conical recess producing axially extending tapered teeth which interfit between the teeth of said other member upon axial movement of one member to engage the other.

4. A clutch comprising, in combination, a pair of coaxially mounted externally toothed members of substantially the same diameters and of like tooth pitch, the teeth of said members being substantially of the configuration of gear teeth, one of said members being axially movable relative to the other, one of said members having the transverse face thereof confronting the other of said members conically recessed such that the large diameter of the conical recess lies in the plane of the confronting transverse face and is of a diameter less than the circle defined by the outer extremities of the teeth, said conical recess producing axially extending tapered teeth which upon axial movement of said one member relative to the other interfit between the teeth of the other of said members thereby rotatably locking the members together.

5. A clutch comprising, in combination, a pair of coaxially mounted externally toothed members of substantially like diameters and having the same number of teeth, said teeth being tapered from root to tip and having the greater dimension at the root, one of said members being axially movable relative to the other, one of said members having the teeth thereof on the axial extremity adjacent the other member, axially extended, said axially extending teeth being undercut to form a sloping surface beginning at the axial tooth extremity at a point adjacent the outer end of the tooth and extending towards the root of the tooth, whereby said axially extending teeth are tapered in both plan form and depth, said axially extending teeth interfitting between the teeth of the other of said members upon axial movement of said member towards the other.

6. A clutch comprising, in combination, a pair of coaxially mounted externally toothed members of substantially like diameters and having the same number of teeth, said teeth being tapered from root to tip and having the greater dimension at the root, at least one of said members being coaxially movable relative to the other, one of said members having the teeth thereof on the axial extremity adjacent the other member axially extended, said axially extending teeth being undercut to form a sloping surface beginning at the axial tooth extremity at a point adjacent the outer radial end of the tooth and extending towards the root of the tooth, said surface being disposed at an angle of substantially ten degrees with respect to the longitudinal axis of said member, whereby said axially extending teeth are tapered in both plan form and depth, said axially extending teeth interfitting between the teeth of the other of said members upon axial movement of said members towards each other.

7. A clutch comprising, in combination, a pair of externally toothed, coaxially mounted members of substantially like diameters and having the same number of teeth, the teeth of said members being substantially of the configuration of gear teeth, at least one of said members having a conical recess in the transverse face confronting the other of said members, said conical recess tapering from said confronting transverse face and forming tooth extensions which taper in both plan form, and depth, said tapered tooth extensions interlocking with the teeth of said other member upon relative axial movement of said members towards each other.

8. A clutch comprising, in combination, a pair of externally toothed members of the same diameter and tooth pitch, said members being coaxially mounted and at least one of said members being axially movable relative to the other, said members having the confronting transverse faces thereof conically recessed such that the large diameter of each of the conical recesses is in the plane of the confronting axial extremities of the respective members and of a diameter less than the addendum circle defined by the teeth thereof, and the small diameter of the conic recesses being greater than the dedendum circle defined by the teeth of each thereof, said conical recesses producing axially extending tapered teeth on each of said members which upon axial movement of said one member towards the other engage in interlocking relation.

KRESTEN L. JEPPESEN.
PERCEVAL H. KEAYS.

REFERENCES CITED

The following references are of record in the file of this patent:

UNITED STATES PATENTS

| Number | Name | Date |
|---|---|---|
| 1,515,100 | Foster | Nov. 11, 1924 |
| 2,079,513 | Lapsley | May 4, 1937 |
| 2,126,200 | Linderman | Aug. 9, 1938 |
| 521,178 | Porter | June 12, 1894 |
| 914,700 | Christensen | Mar. 9, 1909 |
| 945,668 | Alford | Jan. 10, 1910 |
| 1,670,475 | Nicholson | May 22, 1928 |
| 1,706,791 | Leighton | Mar. 26, 1929 |
| 435,802 | Dalzell | Sept. 2, 1890 |
| 1,369,220 | Chryst | Feb. 22, 1921 |

FOREIGN PATENTS

| Number | Country | Date |
|---|---|---|
| 227,235 | Great Britain | Jan. 15, 1925 |